O. B. GERDIN.
GLASS CUTTER.
APPLICATION FILED JAN. 21, 1920.
1,375,958.
Patented Apr. 26, 1921.
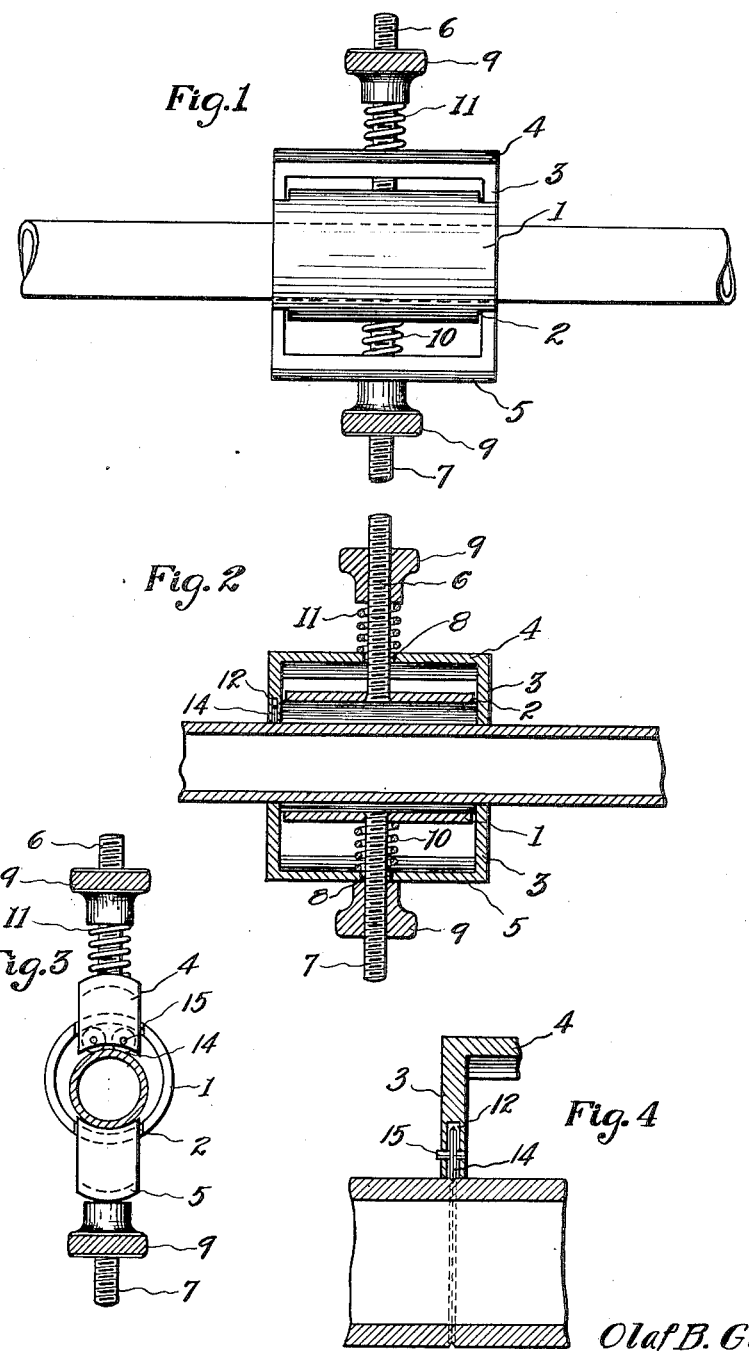
Inventor
Olaf B. Gerdin
By Richard J. Cook
Attorney

UNITED STATES PATENT OFFICE.

OLAF B. GERDIN, OF SEATTLE, WASHINGTON.

GLASS-CUTTER.

1,375,958.   Specification of Letters Patent.   Patented Apr. 26, 1921.

Application filed January 21, 1920. Serial No. 353,073.

*To all whom it may concern:*

Be it known that I, OLAF B. GERDIN, a subject of the King of Sweden, and resident of the city of Seattle, county of King, and State of Washington, have invented certain new and useful Improvements in Glass-Cutters, of which the following is a specification.

This invention relates to glass cutters and more particularly to tools of that character for cutting glass tubes or rods; the principal object of the invention being to provide a device of that character comprising cutting members which may be adjusted to operate on glass tubes of different diameters and which comprises features of construction whereby the cutting members are yieldingly retained against a tube during a cutting operation and automatically retain themselves in cutting engagement therewith.

In accomplishing this, and other objects of the invention, I have provided improved details of construction, the preferred forms of which are illustrated in the accompanying drawings, wherein:

Figure 1 is a side view of a glass cutter embodying the present invention, shown in cutting position on a glass tube.

Fig. 2 is a longitudinal, sectional of the same.

Fig. 3 is an end view of the cutter, illustrating the position of the two cutting disks.

Fig. 4 is an enlarged, sectional view, illustrating the mounting of a cutter disk.

Referring more in detail to the several figures of the drawing, wherein like reference numerals indicate like parts, the numeral 1 designates a short length of cylindrical tubing, which is provided at its opposite ends with diametrically disposed recesses, or slots, 2, for slidably containing the end legs 3 of guiding or positioning members, 4 and 5, whereby a glass tube while being cut is held, or positioned within the tube, 1.

The guide members 4 and 5 each consists of a bar of the same length as the tube 1 and which is disposed longitudinally therewith. These bars lie on opposite sides of the tube with the legs 3 extending inwardly and slidably in the slots 2, and are supported by means of bolts or screws, 6 and 7, which are fixed at their inner ends to the tube and extend outwardly through apertures 8 in the guide members, and at their outer ends have thumb nuts 9 adjustable thereon.

A spring 10 is coiled about the screw 7 between the tube 1 and member 5 so that the latter is retained yieldingly against the adjusting nut. A similar spring 11 is coiled about the bolt 6 between the nut thereon and the member 4, so that this member is yieldingly urged inwardly and the tension thereagainst is adjusted by adjustment of the nut on the bolt.

Disposed within a slot 12 in one of the legs 3 of the guide member 4 are two spaced apart cutting disks 14 which are mounted by means of axles 15 in such a manner that they will have a rolling contact with a glass rod or tube that may be placed within the device and one will follow the other so that there will be but a single cut formed.

The inner ends of the legs 3 are all inwardly curved substantially on a radius equal to the radius of the tube 1, so that these ends will fit against and act to center the tube being operated upon.

Assuming that the device is so constructed, in using the same, the glass tube to be cut is extended through the tube 1, and is then centered therein by the inward or outward adjustment of the guide member 5. The member 4 which carries the cutter disks is adjusted against the glass tube by the spring 11 which maintains the disks in cutting relation therewith.

After the parts have been properly set, the cutter device is revolved about the glass tube so that the disks rolling on the glass tube will form a V-shaped groove thereabout which, by continued rotation of the cutter, gradually grows deeper until through the tube or sufficiently deep that the tube may be broken off with a smooth edge.

It is apparent that the member 5 forms a substantially solid member against which the glass tube may be placed, and the member 4 adjusts itself to accommodate different sizes of tubing and retains the cutters in cutting position as they gradually deepen the cut in the tube.

What I claim as new therein and desire to secure by Letters Patent is:

1. A tube cutting device comprising a cylindrical member, adapted to receive and to be revolved about a tube to be cut, guide members adjustably mounted on the said cylindrical member adapted to engage the tube and to retain the said body in parallel relation thereto, cutting disks radially adjustable against the tube and yieldable means for urging said cutting disks against the tube during a cutting operation.

2. A tube cutting device comprising a cylindrical member adapted to receive and to be revolved about the tube acted upon and having slots in the opposite ends, guide members yieldingly mounted on the cylindrical member having legs slidable in said slots to engage the tube operated upon at opposite ends of the cylindrical member to retain the two in parallel relation and cutting members mounted on one of said guide members whereby a circular cut may be made about a tube when the device is revolved thereon.

3. A tube cutting device comprising a cylindrical member adapted to receive and to be revolved about the tube acted upon, and having guide slots in its opposite ends, bolts mounted in said body and extending outwardly from opposite sides thereof, guide members having apertures receiving said bolts and having legs slidable in said guide slots at opposite ends of the cylindrical member engageable at their inner ends with the tube to retain the cutting device in parallel alinement thereon, a pair of cutting disks mounted on one of said legs engageable with the tube, a spring mounted on one of said bolts to engage said guide to urge the cutting disks carried thereby against the tube, and nuts adjustable on said bolts to adjust the position of the guide members toward or from the tube.

Signed at Seattle, Washington, this 12th day of January, 1920.

OLAF B. GERDIN.